United States Patent
Chen

(10) Patent No.: US 8,944,656 B1
(45) Date of Patent: Feb. 3, 2015

(54) VEHICLE INFRARED PROJECTION DEVICE

(71) Applicant: E-Lead Electronic Co., Ltd., Changhua (TW)

(72) Inventor: Stephen Chen, Changhua (TW)

(73) Assignee: E-Lead Electronic Co., Ltd., Changhua (TW)

( * ) Notice: Subject to any disclaimer, the term of this patent is extended or adjusted under 35 U.S.C. 154(b) by 0 days.

(21) Appl. No.: 14/078,973

(22) Filed: Nov. 13, 2013

(51) Int. Cl.
  *B60Q 1/56* (2006.01)
  *B60Q 1/04* (2006.01)

(52) U.S. Cl.
  CPC .................................. *B60Q 1/04* (2013.01)
  USPC .......................... 362/545; 362/497; 362/543

(58) Field of Classification Search
  USPC ............................... 362/545, 543, 497
  See application file for complete search history.

(56) References Cited

U.S. PATENT DOCUMENTS

| 6,601,980 B2 * | 8/2003 | Kobayashi et al. | 362/510 |
| 7,114,828 B2 * | 10/2006 | Yagi | 362/231 |
| 8,029,175 B2 * | 10/2011 | Koizumi | 362/497 |

* cited by examiner

*Primary Examiner* — Anabel Ton
(74) *Attorney, Agent, or Firm* — Guice Patents PLLC

(57) ABSTRACT

A vehicle infrared projection device, includes a device body, an infrared light source module and a retaining clip, wherein the retaining clip is used to retain the device body below or above a vehicle license plate bracket, a projection opening set on the device body is provided as the projection direction of the infrared light source of the infrared light source module, the focus type lens of the infrared light source module limit an included angle of the projection angle of the infrared light source to 6-15 degree. By the composition of the above elements, the present invention may provide assistance for observing the long-distance road condition at night or poor weather, to thereby improve the traffic safety.

6 Claims, 5 Drawing Sheets

VEHICLE INFRARED PROJECTION DEVICE

BACKGROUND OF THE INVENTION

1. Field of the Invention

The invention relates to a vehicle infrared projection device and, more particularly, a vehicle infrared projection device to assisting a driver, especially applicable for observing the long-distance road condition at night or poor weather, to thereby improve the traffic safety.

2. Brief Description of the Related Art

General car lights are visible light lamps. In order to avoid causing visual interference to front coming cars, dipped headlights are commonly used during driving, but the lighting distance of the dipped headlights is shorter, within about 30 meters, thus a driver who pay attention to night vision safety may install an infrared headlight in the vehicle additionally to improve insufficient lighting. Since infrared is invisible light that may not cause visual influence to drivers of coming cars, the infrared headlight may be made as the angle of high beams and the lighting distance may be effectively increased over 100 meters, but the driver cannot see directly, so an infrared camera is used to show images on screen as reference of the road condition for the driver.

This kind of infrared lighting technology has generally been used in car accessories, and there are also many cited references, such as TW M345727, M353849, and M413619. However, from referring the applications of related embodiments in the cited references, the following problems commonly existed may be found:

1. The design of using the infrared headlights to improve insufficient lighting must be planned during designing the vehicle, or there is no position to install it, so that the infrared lighting cannot be installed in aftermarket.

2. The infrared headlight may be installed above a fog light, but the position and the height of the fog light in each vehicle are different, so the applicability is very limited.

3. According to the related infrared vehicle equipments in the market recently, in the implementation, the infrared technology is mostly combined with alarm devices, the object is to remind a driver to keep a safe distance through the alarm function of alarm devices. Strictly, this kind of equipments may be considered as a traffic detector, they are used to remind the driver to keep a car safe distance. However, an important fact is ignored in the known technology and applications, that since the field of vision is limited when at night or in bad weather, what the driver really needs is the observation of far distance road conditions, not the short distance (within 30 meters) warning alarm. These short distance alert detector cannot meet the needs of drivers. Otherwise, drivers often cannot make a good emergency response in a very short period of time when alerting, especially under high-speed driving, the vehicle may rush the alert effective safe distance in just 1, 2 seconds. In order to overcome the possible danger, the only way is to raise the distance of observing road condition, to let drivers have enough time to react to thereby ensure traffic safety. For this reason, the infrared detecting device with the alert design in the recent market is not ideal driving auxiliary device.

SUMMARY OF THE INVENTION

In view of this, in order to improve the traffic safety, the inventor finally completed the vehicle infrared projection device of the present invention, namely, the object of the present invention is to provide a vehicle infrared projection device, which is especially applicable for observing the long-distance road condition at night or poor weather, to thereby improve the traffic safety.

To achieve the above object according to the invention, the first embodiment of the vehicle infrared projection device of the present invention includes a device body, an infrared light source module and a retaining clip, wherein:

the device body, a containing space is set inside it, a circuit board is set in the containing space, a projection opening is set in the front of the device body;

the infrared light source module, which is electrically connected to the circuit board, the infrared light source module is set in the containing space of the device body, the infrared light source module includes at least an infrared light source, the projection direction of the infrared light source is the direction of the projection opening of the device body;

the retaining clip, which is used to fix the device body below or above a vehicle license plate bracket, the retaining clip is fastened on a plate fixed-position, and the license plate is fixed on its outside.

The above infrared light source module further includes two groups of focus type lens with different projection angles, the focus type lens limit an included angle of the projection angle of the infrared light source to 6-15 degree.

The above infrared light source is a LED light.

The vehicle infrared projection device of the present invention further includes a control circuit, the control circuit is electrically connected to the circuit board, the control circuit is also electrically connected to an electronic device, and the vehicle infrared projection device is connected to the electronic device for controlling to start.

The second embodiment of the vehicle infrared projection device of the present invention includes a device body, an infrared light source module, a retaining clip and an optical sensing module, wherein:

the device body, a containing space is set inside it, a circuit board is set in the containing space, a projection opening is set in the front of the device body;

the infrared light source module, which is electrically connected to the circuit board, the infrared light source module is set in the containing space of the device body, the infrared light source module includes at least an infrared light source, the projection direction of the infrared light source is the direction of the projection opening of the device body;

the retaining clip, which is used to fix the device body below or above a vehicle license plate bracket, the retaining clip is fastened on a plate fixed-position, and the license plate is fixed on its outside;

the optical sensing module, which is electrically connected to the circuit board, the optical sensing module is used to start the vehicle infrared projection device.

The above infrared light source module further includes two groups of focus type lens with different projection angles, the focus type lens is used to limit an included angle of the projection angle of the infrared light source to 6-15 degree.

The above infrared light source is a LED light.

The third embodiment of the vehicle infrared projection device of the present invention includes a device body, an infrared light source module, a retaining clip and a control switch, wherein:

the device body, a containing space is set inside it, a circuit board is set in the containing space, a projection opening is set in the front of the device body;

the infrared light source module, which is electrically connected to the circuit board, the infrared light source module is set in the containing space of the device body, the infrared light source module includes at least an infrared light source, the projection direction of the infrared light source is the direction of the projection opening of the device body;

the retaining clip, which is used to fix the device body below or above a vehicle license plate bracket, the retaining clip is fastened on a plate fixed-position, and the license plate is fixed on its outside;

the control switch, which is electrically connected to the circuit board, the control switch is used to start the vehicle infrared projection device directly.

The above infrared light source module further includes two groups of focus type lens with different projection angles, the focus type lens is used to limit an included angle of the projection angle of the infrared light source to 6-15 degree.

The above infrared light source is a LED light.

The vehicle infrared projection device may improve the observation distance of the road condition to achieve the requirement of long distance (100 meters or more). And, the retaining clip is used to fix the device body below or above the license plate bracket of the vehicle, so it may applicable for installing on all kinds of vehicles. Therefore, the technical means provided by the present invention may effectively solve the drawbacks of the conventional ones, to thereby improve the traffic safety.

BRIEF DESCRIPTION OF THE INVENTION

The detail structure, the applied principle, the function and the effectiveness of the present invention can be more fully understood with reference to the following description and accompanying drawings, in which.

DETAILED DESCRIPTION OF THE PREFERRED EMBODIMENTS

Figure 1:
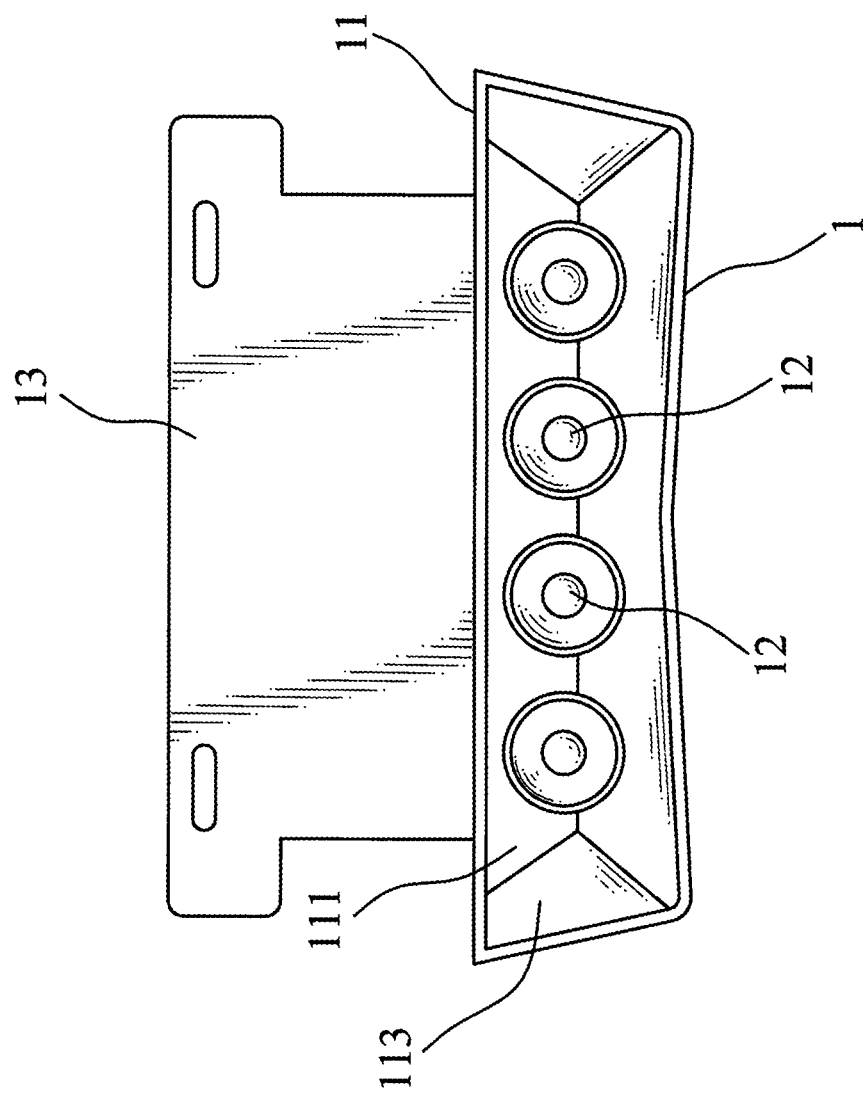
FIG. 1 is a schematic diagram of the front view of the retaining clip above according to the present invention.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

Figure 2:
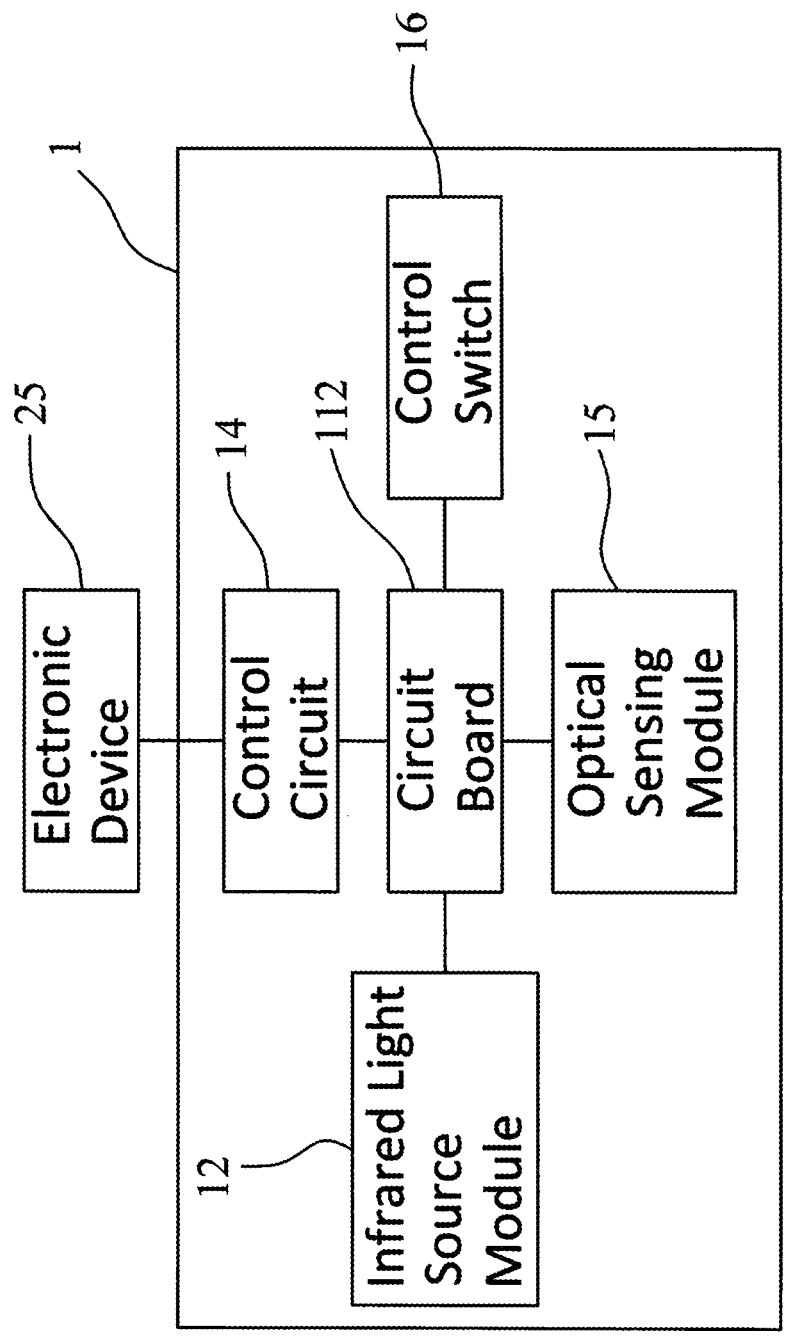
FIG. 2 is a circuit block diagram of the present invention.

As shown in FIG. 1 and FIG. 2, the first embodiment of the vehicle infrared projection device 1 of the present invention includes a device body 11, an infrared light source module 12 and a retaining clip 13 (please refer to FIG. 3, FIG. 4, FIG. 5 simultaneously), wherein:

The device body 11, a containing space 111 is set inside it, a circuit board 112 is set in the containing space 111, and a projection opening 113 is set in the front of the device body 11.

The infrared light source module 12, which is electrically connected to the circuit board 112, the infrared light source module 12 is set in the containing space 111 of the device body 11, the infrared light source module 12 includes at least an infrared light source 121, the projection direction of the infrared light source 121 is the direction of the projection opening 113 of the device body 11.

Figure 3:
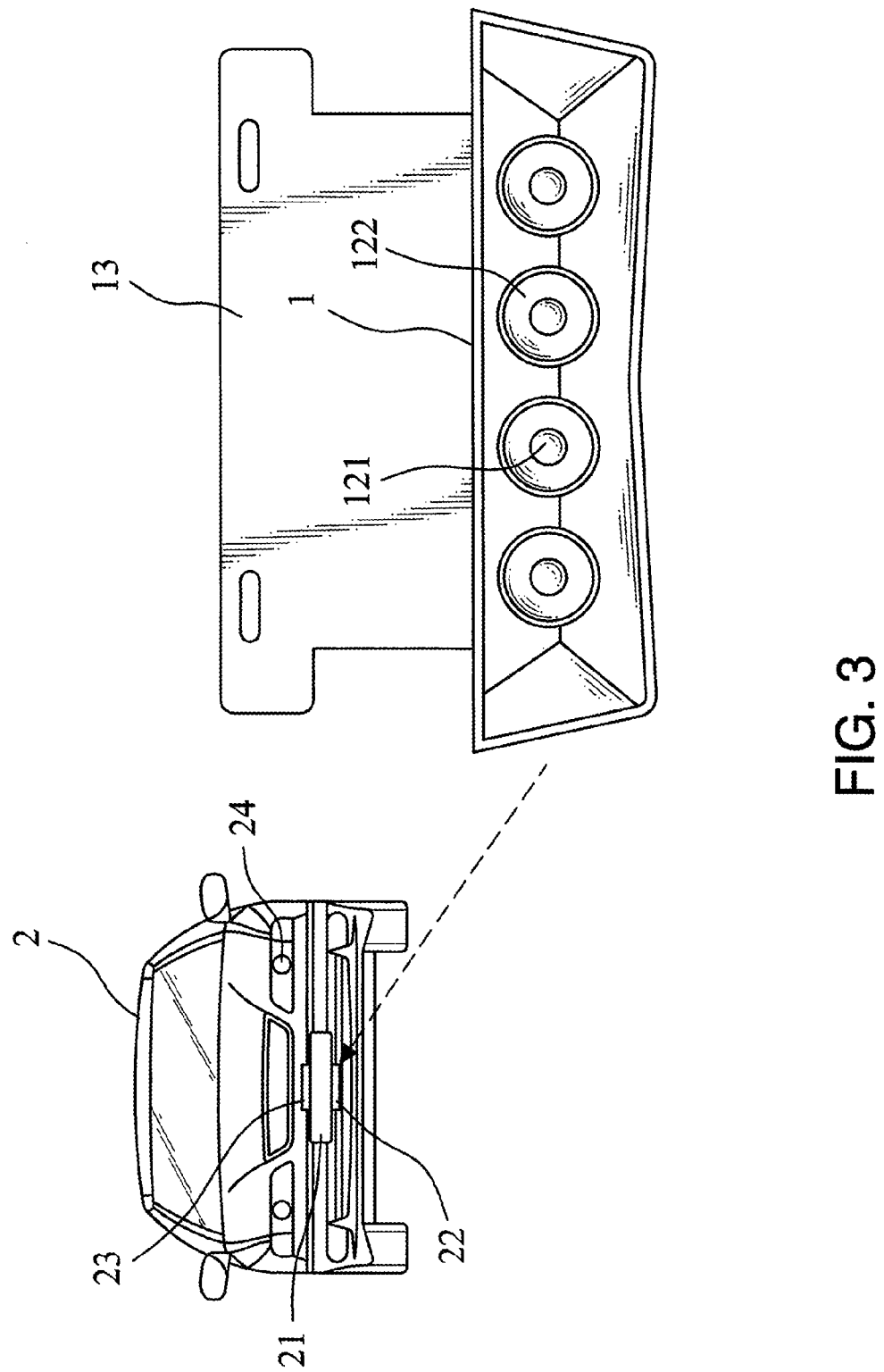
FIG. 3 is a schematic diagram (1) of the present invention installed in the vehicle.
Figure 4:
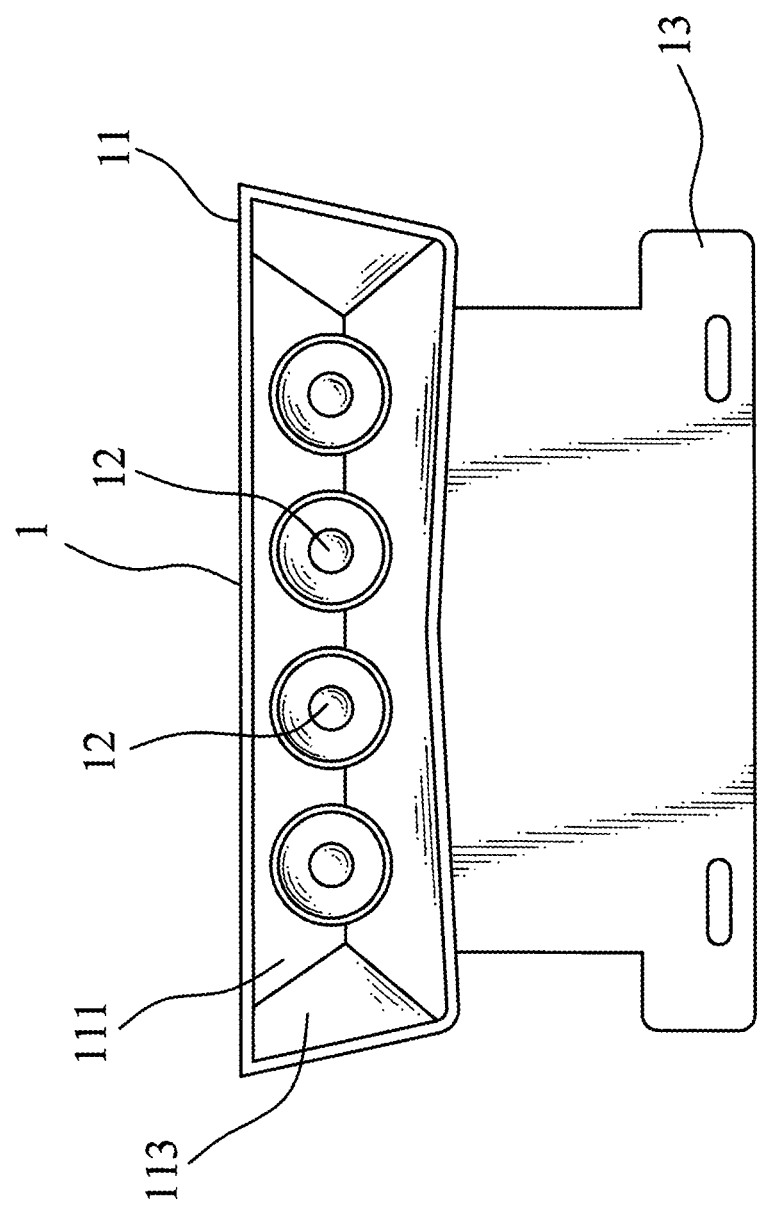
FIG. 4 is a schematic diagram of the front view of the retaining clip below according to the present invention.
Figure 5:
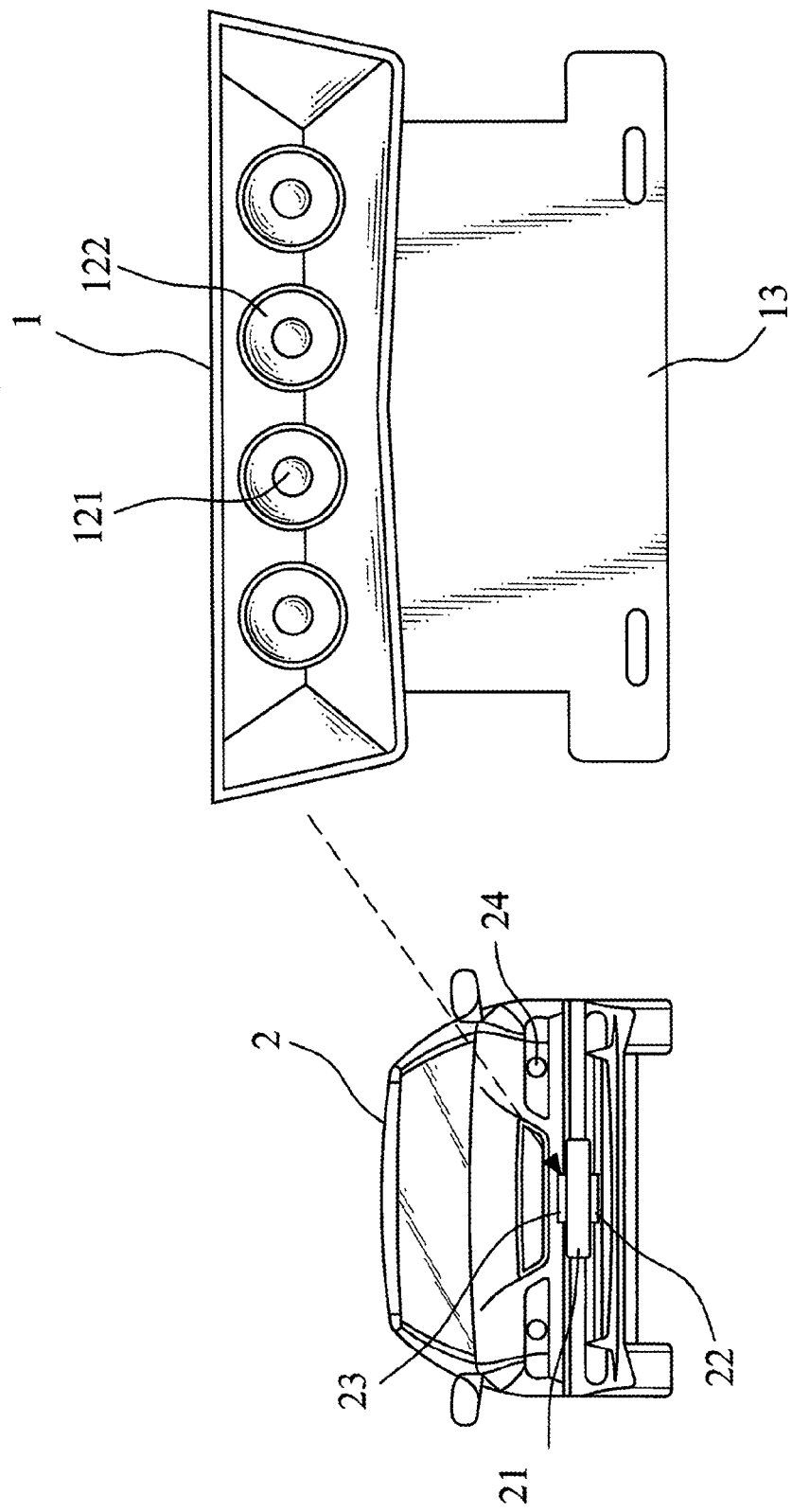
FIG. 5 is a schematic diagram (2) of the present invention installed in the vehicle.

The retaining clip 13, which is used to fix the device body 11 below 22 (as shown in FIG. 1, FIG. 3) or above 23 (as shown in FIG. 4, FIG. 5) a license plate bracket 21 of a vehicle 2, the retaining clip 13 is fastened on a plate fixed-position, and the license plate is fixed on its outside.

The above infrared light source module 12 further includes two groups of focus type lens 122 with different projection angles, the focus type lens 122 is used to limit an included angle of the projection angle of the infrared light source 121 to 6-15 degree, wherein the included angle of the projection angle of one group of the focus type lens 122 is 6 degree, and the included angle of the projection angle of the other group of the focus type lens 122 is 15 degree.

The above infrared light source 121 is a LED light.

The vehicle infrared projection device 1 of the present invention further includes a control circuit 14, the control circuit 14 is electrically connected to the circuit board 112, the control circuit 14 is also electrically connected to a electronic device 25, and the vehicle infrared projection device 1 is connected to the electronic device 25 for controlling to start. The electronic device 25 is a headlight switch, and the vehicle infrared projection device 1 may be started when a headlight 24 of the vehicle 2 is started.

The above electronic device 25 may further be an infrared camera or an event data recorder.

By the composition of the above elements, the vehicle infrared projection device 1 of the present invention, wherein the retaining clip 13 is used to fix the device body 11 below 22 or above 23 the license plate bracket 21 of a vehicle 2, thus it may be applicable for installing on all kinds of vehicles. By the electrical connection of the control circuit 14 and the electronic device 25 of the vehicle 2, the vehicle infrared projection device 1 may be started simultaneously when starting the headlight 24 of the vehicle, the infrared light source 121 of the infrared light source module 12 may project from the projection opening 113 of the device body 11, and then an electronic device 25 may capture an infrared image to provide the observation of the road condition for a driver. Since the infrared light source module 12 includes two groups of focus type lens 122 with different projection angles, the included angle of the projection angle of the infrared light source 121 may be limited to 6-15 degree through the focus type lens 122, so that the effective distance of projection may achieve the requirement of long distance (100 meters or more), and the problem that the observation distance is too short may be solved to improve traffic safety.

As shown in FIGS. 1 to 5, the second embodiment of the vehicle infrared projection device 1 of the present invention includes a device body 11, an infrared light source module 12, a retaining clip 13 and an optical sensing module 15, wherein:

The device body 11, a containing space 111 is set inside it, a circuit board 112 is set in the containing space 111, a projection opening 113 is set in the front of the device body 11.

The infrared light source module 12, which is electrically connected to the circuit board 112, the infrared light source module 12 is set in the containing space 111 of the device body 11, the infrared light source module 12 includes at least an infrared light source 121, the projection direction of the infrared light source 121 is the direction of the projection opening 113 of the device body 11.

The retaining clip 13, which is used to fix the device body 11 below 22 (as shown in FIG. 1, FIG. 3) or above 23 (as shown in FIG. 4, FIG. 5) a license plate bracket 21 of a vehicle 2, the retaining clip 13 is fastened on a plate fixed-position, and the license plate is fixed on its outside.

The optical sensing module 15 is electrically connected to the circuit board 112. When in bad weather, such as a cloudy day, at night, raining or dense fog, the optical sensing module 15 may start the vehicle infrared projection device 1.

The above infrared light source module 12 further includes two groups of focus type lens 122 with different projection angles, the focus type lens 122 limit an included angle of the projection angle of the infrared light source 121 to 6-15 degree, wherein the included angle of the projection angle of one group of the focus type lens 122 is 6 degree, and the included angle of the projection angle of the other group of the focus type lens 122 is 15 degree.

The above infrared light source 121 is a LED light.

By the composition of the above elements, the vehicle infrared projection device 1 of the present invention, wherein the retaining clip 13 is used to fix the device body 11 below 22 or above 23 the license plate bracket 21 of a vehicle 2, thus it may be applicable for installing on all kinds of vehicles. Besides, when at night or in bad weather, the optical sensing module 15 may automatically start the vehicle infrared projection device 1, that the infrared light source 121 of the infrared light source module 12 may project from the projection opening 113 of the device body 11, and then an electronic device 25 may capture an infrared image to provide the observation of the road condition for a driver. Since the infrared light source module 12 includes two groups of focus type lens 122 with different projection angles, the focus type lens 122 may limit the included angle of the projection angle of the infrared light source 121 to 6-15 degree, so that the effective distance of projection may achieve the requirement of long distance (100 meters or more), and the problem that the observation distance is too short may be solved to improve traffic safety.

As shown in FIGS. 1 to 4, the third embodiment of the vehicle infrared projection device 1 of the present invention includes a device body 11, an infrared light source module 12, a retaining clip 13 and a control switch 16, wherein:

The device body 11, a containing space 111 is set inside it, a circuit board 112 is set in the containing space 111, a projection opening 113 is set in the front of the device body 11.

The infrared light source module 12, which is electrically connected to the circuit board 112, the infrared light source module 12 is set in the containing space 111 of the device body 11, the infrared light source module 12 includes at least an infrared light source 121, the projection direction of the infrared light source 121 is the direction of the projection opening 113 of the device body 11.

The retaining clip 13, which is used to fix the device body 11 below 22 (as shown in FIG. 1, FIG. 3) or above 23 (as shown in FIG. 4, FIG. 5) a license plate bracket 21 of a vehicle 2, the retaining clip 13 is fastened on a plate fixed-position, and the license plate is fixed on its outside.

The control switch 16, which is electrically connected to the circuit 112, the control switch 16 is provided the driver to directly start the vehicle infrared projection device 1.

The above infrared light source module 12 further includes two groups of focus type lens 122 with different projection angles, the focus type lens 122 limit an included angle of the projection angle of the infrared light source 121 to 6-15 degree, wherein the included angle of the projection angle of one group of the focus type lens 122 is 6 degree, and the included angle of the projection angle of the other group of the focus type lens 122 is 15 degree.

The above infrared light source 121 is a LED light.

The above circuit board 112 is electrically connected to the infrared light source module 12.

The above circuit board 112 is electrically connected to the infrared light source module 12, the control circuit 14, the optical sensing module 15 and the control switch 16 simultaneously.

By the composition of the above elements, the vehicle infrared projection device 1, wherein the retaining clip 13 is used to fix the device body 11 below 22 or above 23 the license plate bracket 21 of a vehicle 2, thus the present invention is applicable for installing on all kinds of vehicles. Besides, when at night or in bad weather, a driver may control the control switch 16 to start the infrared light source 121 of the infrared light source module 12 projecting from the projection opening 113 of the device body 11, and then an electronic device 25 may capture an infrared image to provide the observation of the road condition for the driver. Since the infrared light source module 12 includes two groups of focus type lens 122 with different projection angles, the focus type lens 122 may limit the included angle of the projection angle of the infrared light source 121 to 6-15 degree, so that the effective distance of projection may achieve the requirement of long distance (100 meters or more), and the problem that the observation distance is too short may be solved to improve traffic safety.

I claim:

1. A vehicle infrared projection device, which includes a device body, an infrared light source module, a retaining clip and an optical sensing module, wherein:

the device body, a containing space is set inside it, a circuit board is set in the containing space, a projection opening is set in the front of the device body;

the infrared light source module, which is electrically connected to the circuit board, the infrared light source module is set in the containing space of the device body, the infrared light source module includes at least an infrared light source, the projection direction of the infrared light source is the direction of the projection opening of the device body;

the retaining clip, which is used to fix the device body below or above a vehicle license plate bracket, the retaining clip is fastened to the vehicle license plate bracket and a license plate is fixed to an outside of the vehicle license plate bracket;

the optical sensing module, which is electrically connected to the circuit board, the optical sensing module is used to start the vehicle infrared projection device.

2. The vehicle infrared projection device as claimed in claim 1, wherein the infrared light source module further includes two groups of focus type lens with different projection angles, the focus type lens is used to limit an included angle of the projection angle of the infrared light source to 6-15 degree.

3. The vehicle infrared projection device as claimed in claim 1, wherein the infrared light source is a LED light.

4. A vehicle infrared projection device, which includes a device body, an infrared light source module, a retaining clip and a control switch, wherein:

the device body, a containing space is set inside it, a circuit board is set in the containing space, a projection opening is set in the front of the device body;

the infrared light source module, which is electrically connected to the circuit board, the infrared light source module is set in the containing space of the device body, the infrared light source module includes at least an infrared light source, the projection direction of the infrared light source is the direction of the projection opening of the device body;

the retaining clip, which is used to fix the device body below or above a vehicle license plate bracket, the retaining clip is fastened to the vehicle license plate bracket and a license plate is fixed to an outside of the vehicle license plate bracket;

the control switch, which is electrically connected to the circuit, the control switch is provided to start the vehicle infrared projection device.

5. The vehicle infrared projection device as claimed in claim 4, wherein the infrared light source module further includes two groups of focus type lens with different projection angles, the focus type lens is used to limit an included angle of the projection angle of the infrared light source to 6-15 degree.

6. The vehicle infrared projection device as claimed in claim 4, wherein the infrared light source is a LED light.

* * * * *